(12) United States Patent
Ganev et al.

(10) Patent No.: US 7,276,871 B2
(45) Date of Patent: Oct. 2, 2007

(54) SYSTEM AND METHOD FOR FAULT PROTECTION FOR PERMANENT MAGNET MACHINES

(75) Inventors: Evgeni Ganev, Torrance, CA (US); Madan L. Bansal, Rancho Palos Verdes, CA (US); William H. Warr, Glendale, CA (US)

(73) Assignee: Honeywell International, Inc., Morristown, NJ (US)

( * ) Notice: Subject to any disclaimer, the term of this patent is extended or adjusted under 35 U.S.C. 154(b) by 74 days.

(21) Appl. No.: 11/189,177

(22) Filed: Jul. 25, 2005

(65) Prior Publication Data

US 2007/0030606 A1 Feb. 8, 2007

(51) Int. Cl.
*H02H 7/085* (2006.01)

(52) U.S. Cl. .......................................... 318/434; 361/31
(58) Field of Classification Search ........ 318/432–434; 388/903; 361/23–34

See application file for complete search history.

(56) References Cited

U.S. PATENT DOCUMENTS

| | | | | |
|---|---|---|---|---|
| 4,806,839 A | * | 2/1989 | Nagato et al. | 318/798 |
| 6,297,573 B1 | * | 10/2001 | Roth-Stielow et al. | 310/68 C |
| 6,320,731 B1 | | 11/2001 | Eaves et al. | |
| 6,577,086 B2 | | 6/2003 | Sebastian | |
| 6,750,576 B2 | | 6/2004 | Ehrhart et al. | |
| 6,759,823 B2 | * | 7/2004 | Witzig | 318/434 |
| 6,965,206 B2 | * | 11/2005 | Kamen et al. | 318/139 |

* cited by examiner

*Primary Examiner*—Bentsu Ro
(74) *Attorney, Agent, or Firm*—Oral Caglar, Esq.

(57) ABSTRACT

A fault protection system and method of fault protection for permanent magnet machine (PMM)-based systems that utilize machine neutral decoupling (MND) to shut down a shorted winding and/or to isolate a short-circuit fault to prevent damage to a permanent magnet machine and to any downstream components are provided. The invention may be used for high-reactance and/or high current PMM-based systems, such as are commonly found in industrial and aviation applications.

10 Claims, 8 Drawing Sheets

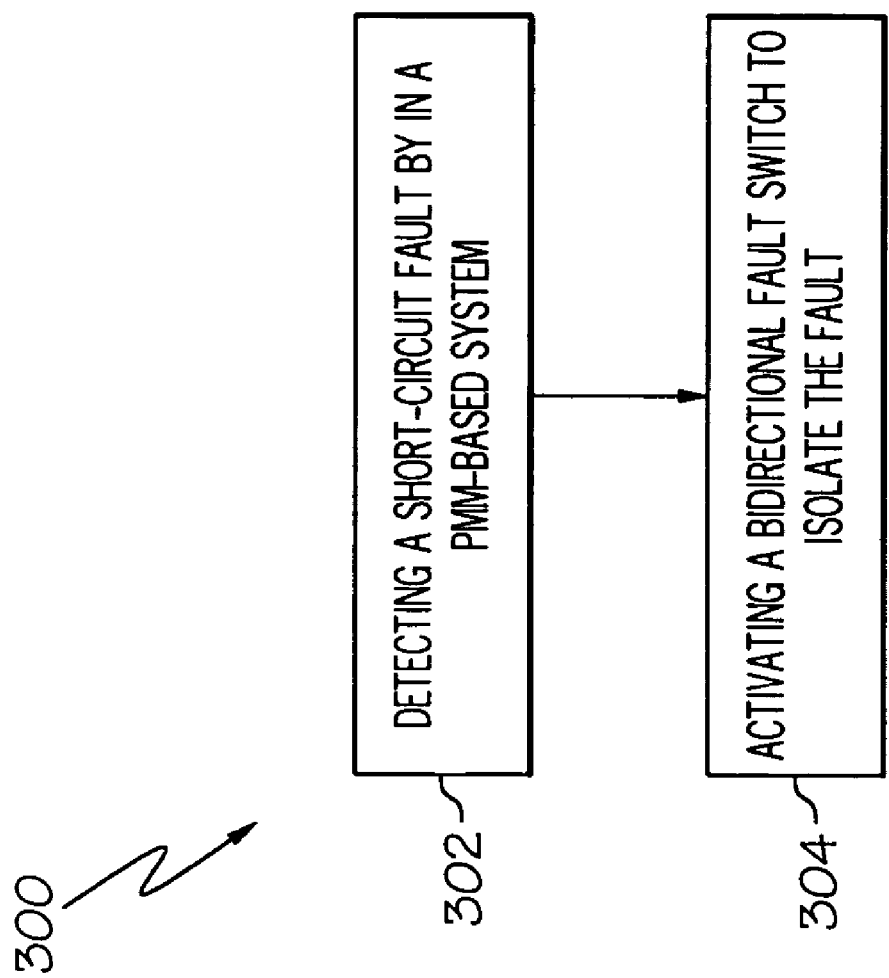

SYSTEM AND METHOD FOR FAULT PROTECTION FOR PERMANENT MAGNET MACHINES

BACKGROUND OF THE INVENTION

The present invention relates generally to fault-protection systems for machines where rotor flux cannot be controlled, and more particularly, to fault protection systems for synchronous permanent magnet machines.

Permanent magnet machine (PMM) motors and generators are well known in the art. Such devices have windings that cut through the magnetic lines of force of a set of permanent magnets. The magnets may be arranged around a rotating set of windings or, conversely, windings may be arranged around a rotating magnet.

PMMs are relatively inexpensive and easy to construct and outperform other designs in most applications. A drawback, however, is that the rotor flux in a PMM is fixed and cannot be controlled or disengaged when a short circuit occurs. Unlike other designs, such as wound-field (WF), induction, and switch-reluctance machines (SRM), where the excitation of the rotor flux may be controlled or shut down completely, a PMM continues to generate voltage until the rotor stops spinning. The result is that PMMs typically suffer major damage when a short circuit occurs in the system, resulting from massive currents flowing through the windings and generating high temperatures that typically melt and burn the machine's components. Therefore, a PMM may present a hazard in some applications leading to its limited use, particularly in the aerospace industry.

There are a number of systems for short-circuit protection in the art. One such system is a high-reactance permanent magnet machine (HRPMM) that limits phase current magnitude upon a short circuit so as to limit heat and current damage. Another prior art system for short-circuit protection uses a dc contactor that isolates the load from the inverter so as to protect the load, but again fails to protect the PMM itself and the inverter/converter. Yet another prior art system uses a three-phase contactor in the feeder between the machine and an inverter, as shown in FIG. 1, which can protect the inverter from damage caused by a short in the machine, but not the machine itself.

Referring to FIG. 1, there is shown the prior art fault protection system 11 having a permanent magnet machine (PMM) 10 and a fault protection unit 26. The PMM 10 can be represented as an AC source 12 and an inductor 14 in series to simulate each winding 16, such as in an electric motor or generator. Each winding 16 is connected to the PMM's neutral point 20. An AC feeder 17 is provided, which may be little more than a set of wires that delivers the AC output of the PMM 10 to a load 24. If the load 24 is a DC device, then an inverter/converter 18 may be provided to rectify the PMM output to DC, which is then delivered to the load 24 via a DC feeder 22, which again may be nothing more than a set of wires. The prior art fault protection unit 26 is generally a set of switches 27 in the AC feeder 17 that respond to current sensors. If a short-circuit develops causing excessive current to flow through one of the windings 16, the sensor signals the PMM 10 to shut down and signals the switch 27 for that winding to open, thereby isolating the AC feeder 17, the inverter/converter 18, the DC feeder 22, and the load 24 from the short-circuited (or faulted) winding. If the short occurs downstream of the prior art fault protector switches 27, then the faulted PMM winding may be protected also. If the short occurs upstream of the prior art fault protection switches 27, then the PMM 10 may be damaged during the time it takes for the rotor to slow to a stop, typically about 10 seconds.

U.S. Pat. No. 6,577,086 discloses a method of machine neutral decoupling (MND) where the connection between the shorted winding and the machine neutral is broken. The '086 patent interposes a metal-oxide semiconductor field-effect transistor (MOSFET) between each winding and the machine neutral. The drawback with this design is that it is unidirectional in that current is blocked in only one direction. This necessitates the connection of a diode across each MOSFET that permits reverse current to flow from source to drain, so even when the MOSFET is shut off current still flows in the reverse direction. Hence, opening the MOSFET doesn't completely shut off the current in its associated winding, but merely reduces it to a half-wave. This may be sufficient for small electric motors, but for PMMs operating at high currents, this may not be sufficient to prevent damage.

Alternatively, U.S. Pat. No. 6,750,576 discloses a method for mitigating damage by a short-circuit by distributing the short-circuit current over a larger number of turns in the associated winding. The method of the '576 patent accomplishes this by, upon detection of a short-circuit in a turn or turn section of a winding, the entire coil is short-circuited at the terminals, resulting in a short-circuit current throughout the entire winding. The result is a reduction of the short-circuit current in the originally affected turn is reduced considerably so that the losses cause by the "distributed" short-circuit current can be compensated by coolants. However, like the other prior art systems described above, the fault current is only mitigated.

What is needed is a system for rapidly interrupting short-circuit current in a machine, thereby protecting not only the motor itself, but all the downstream components, such as an inverter and load. It would also be advantageous to have a system that can prevent the occurrence of a short circuit.

SUMMARY OF THE INVENTION

In one aspect of the present invention, there is provided a fault protection system comprising a permanent magnet machine, the permanent magnet machine comprising a plurality of windings and a neutral point; a neutral winding decoupling fault protector, the neutral winding decoupling fault protector comprising; at least one bidirectional fault switch, the bidirectional fault switch connecting the at least one of the plurality of windings to the neutral point, and wherein the bidirectional fault switch is capable of completely electrically disconnecting at least one of the plurality of windings from the neutral point; and at least one sensor, the fault sensor adapted to detect a fault in one of the plurality of windings and to open the bidirectional fault switch when the fault in one of the plurality of windings is detected by the sensor.

In another aspect of the present invention, there is provided a fault protection system comprising a permanent magnet machine, the permanent magnet machine comprising a plurality of windings and a neutral point; and a neutral winding decoupling fault protector, the neutral winding decoupling fault protector comprising; at least one bidirectional fault switch, the bidirectional fault switch connecting the at least one of the plurality of windings to the neutral point, wherein the bidirectional fault switch is capable of completely electrically disconnecting at least one of the plurality of windings from the neutral point and wherein the bidirectional switch is a solid-state switch; and at least one sensor, the sensor adapted to detect a fault in one of the plurality of windings and to open the bidirectional fault switch when the fault in one of the plurality of windings is detected by the sensor.

In a further aspect of the present invention, there is provided a fault protection system comprising a permanent magnet machine, the permanent magnet machine comprising a plurality of windings and a neutral point; and a neutral winding decoupling fault protector, the neutral winding decoupling fault protector comprising; a plurality of bidirectional fault switches wherein the number of bidirectional fault switches is the same as the number of windings and wherein the plurality of bidirectional fault switches connect the plurality of windings to the neutral point, and wherein at least one bidirectional fault switch is capable of completely electrically disconnecting at least one winding from the neutral point; and at least one sensor, the sensor adapted to detect a fault in one of the plurality of windings and to open the bidirectional fault switch when the fault in one of the plurality of windings is detected by the sensor.

In yet another aspect of the present invention, there is provided a method for interrupting a short-circuit fault in a permanent magnet machine, wherein the permanent magnet machine comprises a plurality of windings and a neutral point, the method comprising the steps of detecting a short-circuit fault in at least one of the plurality of windings; and in response to detection of the short-circuit fault, activating a bidirectional fault switch, wherein the bidirectional fault switch isolates the at least one faulted winding from all other windings, the bidirectional fault switch connecting the at least one faulted winding of the plurality of windings to the neutral point.

These and other features, aspects and advantages of the present invention will become better understood with reference to the following drawings, description and claims.

BRIEF DESCRIPTION OF THE DRAWINGS

FIG. 7 is a flow chart for a method of fault protection for a permanent magnet machine, according to the invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a system and method of fault protection for permanent magnet machines (PMM) that utilizes machine neutral decoupling (MND) to shut down a shorted winding to prevent damage to the permanent magnet machine and to any downstream components, such as an inverter and a load. The invention may be used for high-reactance and low reactance PMMs, such as are commonly found in industrial and aviation applications.

In contrast to the fault protection systems of the prior art, the present invention may interrupt a short-circuit current before it can damage the PMM and other components. The fault protection system of the present invention may comprise at least one bidirectional fault switch at a neutral point which may rapidly interrupt the short-circuit current. The fault protection of the present invention may also be used as a preventative mechanism prior to the occurrence of the short-circuit. The fault protection schemes of the prior art have, at most, unidirectional switches that only mitigate the short-circuit current and reduce the damage.

Figure 1:
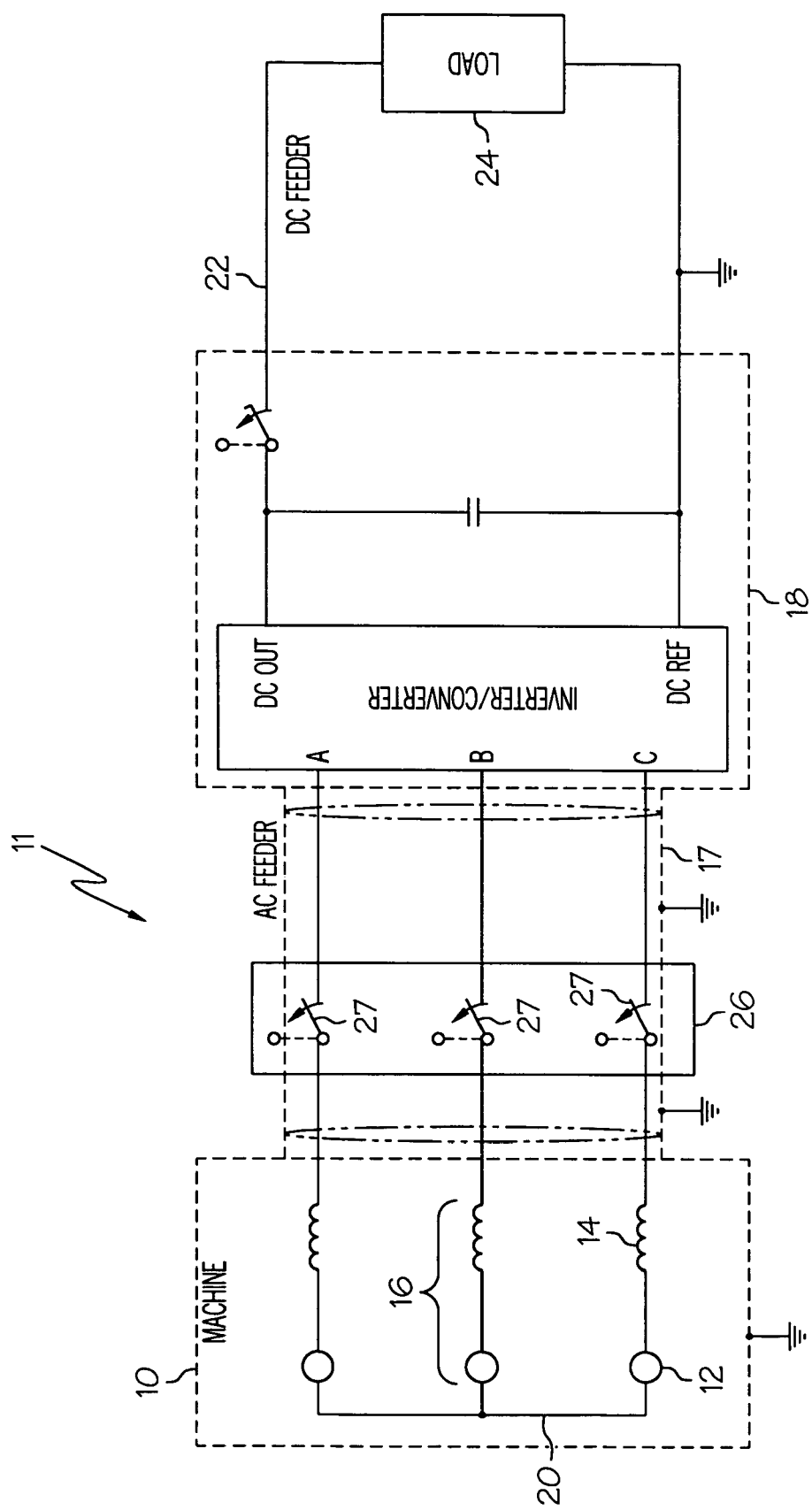
FIG. 1 is a schematic representation of a prior art fault protection system.
Figure 2:
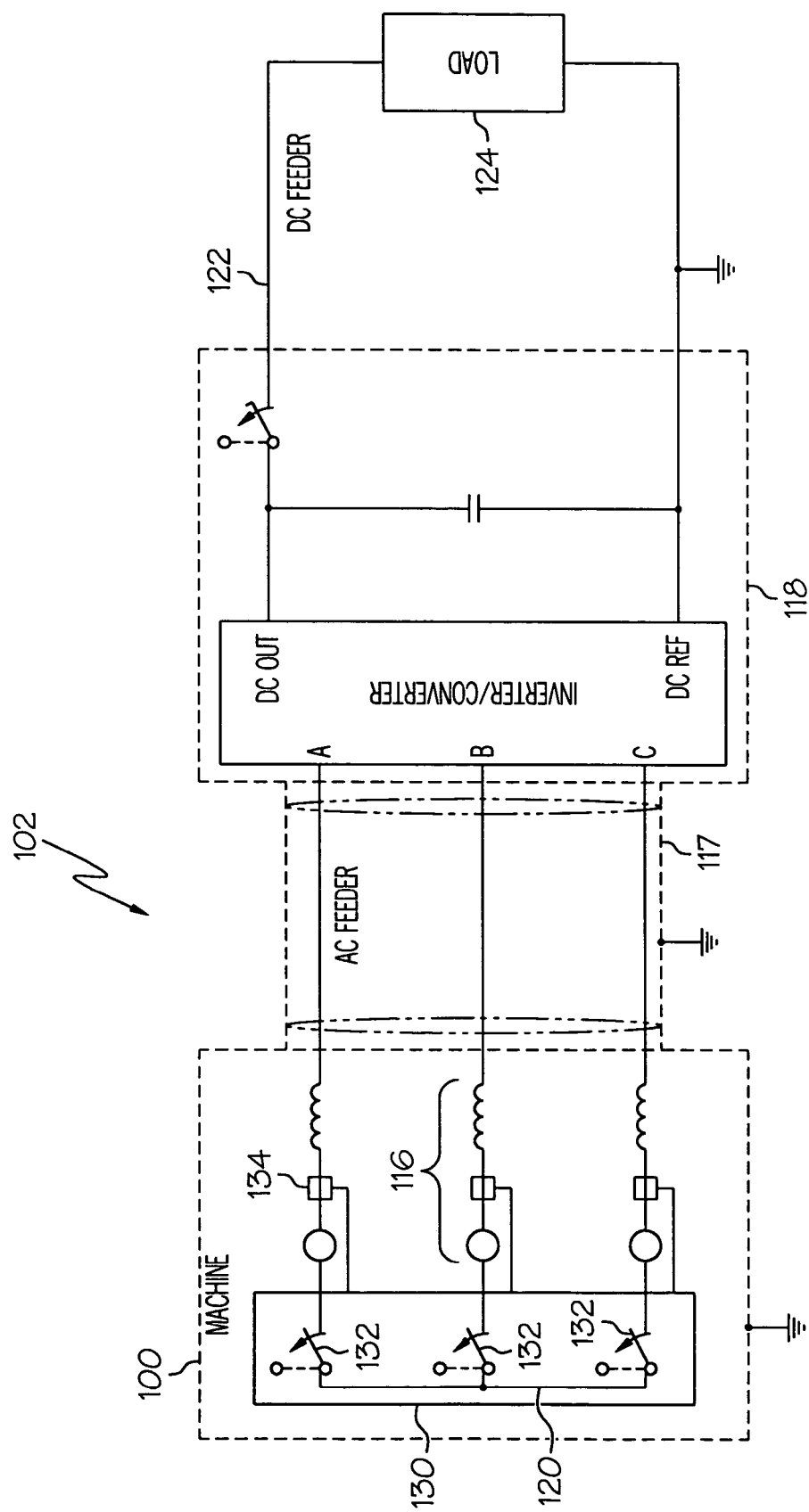
FIG. 2 is a schematic representation of a fault protection system, according to the invention.

Referring to FIG. 2, there is shown a schematic representation of a permanent magnetic machine (PMM)-based system 102 of the present invention which may comprise a permanent magnet machine (PMM) 100 and a neutral winding decoupling fault protector 130. The permanent magnet machine (PMM) 100 may have a permanent magnet rotor (not shown) and three windings 116. Each winding 116 of PMM 100 may be connected to a neutral point 120 through a neutral winding decoupling fault protector 130 of the invention.

PMM-based system 102 may further comprise an AC feeder 117, which may deliver an AC output of the PMM 100 to a load 124 where load 124 may have an electrical connection with PMM 100. Alternatively, load 124 may be a DC device where an inverter/converter 118 may be provided to rectify the PMM 100 AC output to DC, which may then be delivered to load 124 via a DC feeder 122.

Neutral winding decoupling fault protector 130 may comprise a plurality of bidirectional fault switches 132 where the plurality of bidirectional fault switches 132 may enable individual windings 116 to be decoupled from the neutral point 120 when a short-circuit fault is detected in PMM-based system 102. Sensors 134 may be provided to activate and open individual bidirectional fault switches 132 associated with a faulted winding 116 when the short-circuit fault is detected in that winding 116. In an illustrative embodiment, only one sensor 134 may be used to open all three switches 132. Sensors 134 may be of the type well known in the art and may be easily constructed or purchased. It will be appreciated that short circuit faults may not be limited to windings 116, but may be detected by sensor 134 at different locations of the system including AC feeder 117, inverter/converter 118 or DC feeder 122. These faults may also activate the protection switches 132. Short-circuit faults may be detected when the current running through winding 116, AC feeder 117, inverter/converter 118 or DC feeder 122 exceeds a predetermined maximum threshold value. The maximum threshold level may vary depending on the parameters of the permanent magnet machine and other components in the system.

Short-circuit faults, particularly involving PMMs, may generally be classified in two forms. The first may be a shorting of a winding to ground, while the other may be a shorting of one winding to another. Because the windings 116 are not in phase, excessive current will flow back and forth between faulted windings until the rotor stops rotating, damaging all of the windings 116 involved. The damage inflicted upon a PMM may be directly related to the time it takes to cut power to a faulted winding, namely:

$$W = \int_0^T I^2(t) Z \, dt$$

Where W is the dissipated thermal energy, I(t) is the current through the faulted winding as a function of time, Z is the impedance of the faulted winding, and T is the time needed to shut off the current.

A number of bidirectional fault switches 132 may be used in the PMM-based system 102 of the present invention. Non-limiting examples are given below in Table 1. The simplest bidirectional fault switch 132 and "sensor" 134 of the present invention may be, for example, one in which these functions are integrated together such as, but not limited to, a fuse. A fuse may be efficient and inexpensive in that it both detects the presence of excess current and acts to cut it off. A fuse may act about ten times faster than simply shutting off PMM 100 and waiting for the rotor to stop. A typical fuse will detect and blow within about 1 second as compared to about 10 seconds for the rotor to stop (Table 1).

TABLE 1

Table 1. Examples of Bidirectional Fault Switches

| Clearing Device | Time Delay | Relative Delay Energy Improvement |
| --- | --- | --- |
| Stop rotor | ~10 seconds | Unity |
| Fuse | ~1 second | 10 times less than stop rotor |
| Contactor | ~50 msec | 200 times less than stop rotor |
| Solid state switch | ~10 usec | 1,000,000 times less than stop rotor |
| Arc detection | 0 | No destructive energy imposed |

A faster switch, one appropriate for high-reactance PMMs 100, may be an AC contactor, which may simply be an electromechanical switch, usually activated by a solenoid. The time delay from the sensing of a fault to the opening of the switch may be about 50 milliseconds, or about twenty times faster than a fuse and 200 times faster than to stop the rotor (Table 1).

Figure 3:
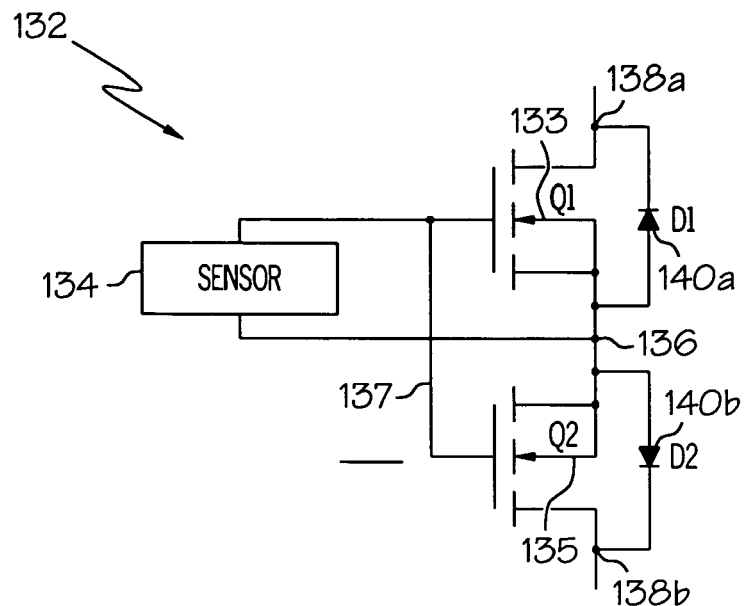
FIG. 3 is a circuit diagram of a bidirectional fault switch using n-type MOSFET devices, according to the present invention.
Figure 4:
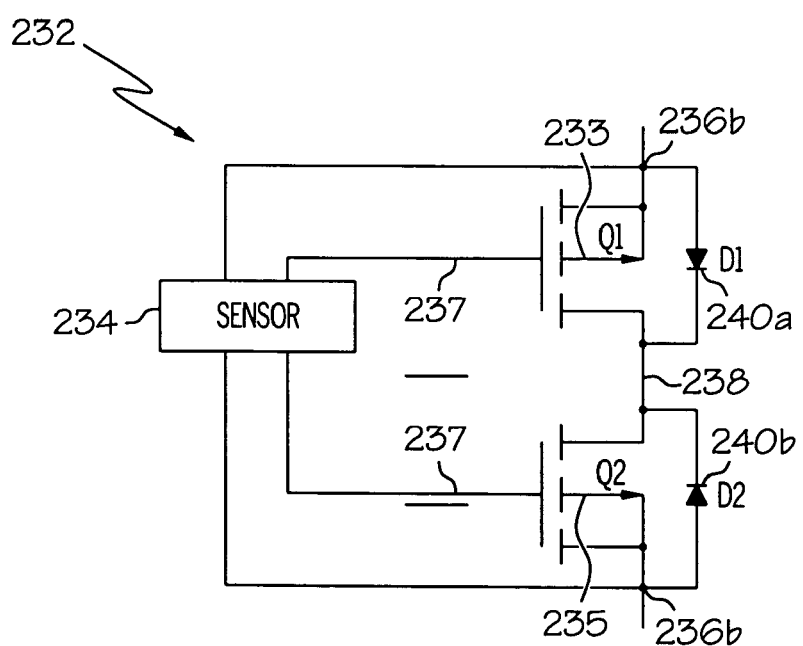
FIG. 4 is a circuit diagram of a bidirectional fault switch using p-type MOSFET devices, according to the present invention.

An example of an even faster switch may be bidirectional solid-state switches, which typically open within 10 microseconds of fault detection, which is 100,000 times faster than a typical fuse (Table 1). Bidirectional solid-state switches may be easily fabricated by connecting two semiconductor transistors in series, such as shown in FIGS. 3 and 4, with a common gate activated by the sensor 134. When the gate voltage is brought low, or brought to the source voltage in, for example, a metal-oxide semiconductor field-effect transistor (MOSFET), the transistors shut off.

Referring to FIG. 3, there is shown a bidirectional fault switch 132 which may comprise a sensor 134, a first n-type semiconductor transistor (Q1) 133 and a second n-type semiconductor transistor (Q2) 135 where the first n-type semiconductor transistor 133 and second 135 n-type semiconductor transistor may be connected in a common source and common gate configuration. FIG. 3 shows the symbol for an n-type MOSFET, but it is to be understood for the purposes of this specification that these symbols may stand in for other devices, such as, but not limited to, n-type insulated gate bipolar transistors (IGBT) or n-type reverse-blocking insulated gate bipolar transistors (RB-IGBT). The first 133 and second 135 n-type semiconductor transistors may each comprise a first drain 138a and a second drain 138b, respectively, and may further share a source 136 (or, in the case of an IGBT or RB-IGBT, first and second collectors 138a, 138b and an emitter 136). For the first 133 and second 135 n-type semiconductor transistors shown in FIG. 3, the source 136 may be connected to form a common source configuration. One drain, first drain 138a or second drain 138b, may be connected to winding 116, while the other may be connected to the neutral point 120. The first n-type semiconductor transistor 133 and second n-type semiconductor transistor 135 may each further comprise a first diode (D1) 140a and a second diode (D2) 140b, respectively. The first diode 140a and second 140b diode may be connected to first 133 and second 135 n-type semiconductor transistor respectively, creating a path for the flow of current from source 136 through the first 133 and second 135 n-type semiconductor transistors to first drain 138a and second drain 138b, respectively. The sensor 134, upon detecting a short-circuit current (or fault), may activate the first 133 and second 135 n-type semiconductor transistors by applying an activating voltage across a common gate 137 and the common source 136. When alternating current flows in one direction, it may pass through, for example, activated first semiconductor transistor 133 and then through first diode 140a in parallel with second n-type semiconductor transistor 135. In this manner, the bidirectional fault switch 132 may be bidirectional because it controls the flow of current in both directions. The first 140a and second 140b diodes, in the case of a MOSFET, may be readily provided by shorting the base of the MOSFET to the source. Alternatively, IGBTs and RB-IGBTs may require that actual first 140a and second 140b diodes be provided because they lack this internal diode capability.

An alternative bidirectional fault switch 232 is shown in FIG. 4. Bidirectional fault switch 232 may comprise a sensor 234, a first p-type semiconductor transistor (Q1) 233 and a second p-type semiconductor transistor (Q2) 235, where first 233 and second 235 p-type semiconductors may comprise a common drain 238 and a first source 236a and a second source 236b, respectively. The first 233 and second 235 p-type semiconductor transistors may be connected in a common drain and common gate configuration. The first 233 and second 235 p-type semiconductor transistors may be MOSFET, IGBT or RB-IGBT. As described above, the sensor 234 may shut off first p-type semiconductor transistor (Q1) 233 and second p-type semiconductor transistor (Q2) 235 by bringing gates 237 to the source 236a, 236b voltage. The first 233 and second 235 p-type semiconductors may each further comprise a first diode (D1) 240a and a second diode (D2) 240b, respectively, creating a path for the flow of current from first source 236a and/or second source 236b through first 233 and/or second 235 p-type semiconductor transistor, respectively, to common drain 238. With respect to the bidirectional fault switch 132 in FIG. 3, the first diode 240a and second diode 240b of bidirectional fault switch 232 may be in the opposite direction.

Referring back to FIG. 2, the bidirectional fault switches 132 may also be pyrotechnic squibs that break the connection between a winding 16 and the neutral point 20 upon detonation. A pyrotechnic squib may also be used in conjunction with a fuse to decrease the time delay of the fuse. Reaction times of the pyrotechnic squibs from fault detection may vary, but generally may be faster than a fuse, though not faster than a solid-state switch.

Figure 5A:
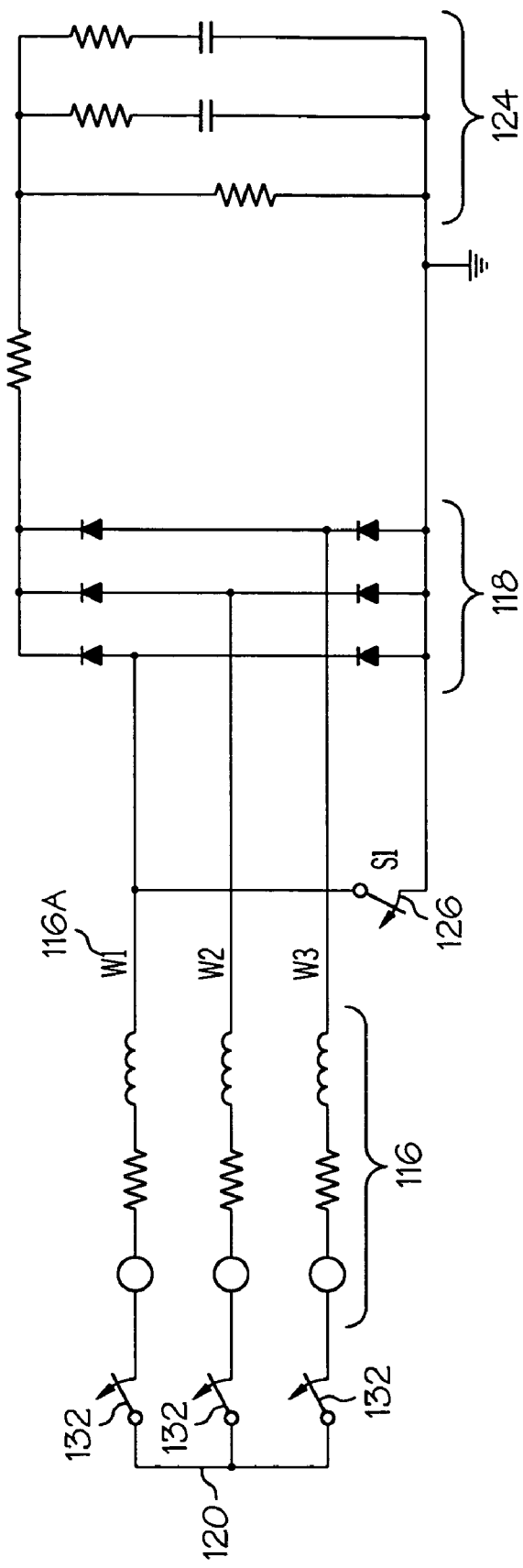
FIG. 5A is a schematic representation of the fault protection system configured to simulate a short to ground in a winding, according to the invention.
Figure 5B:
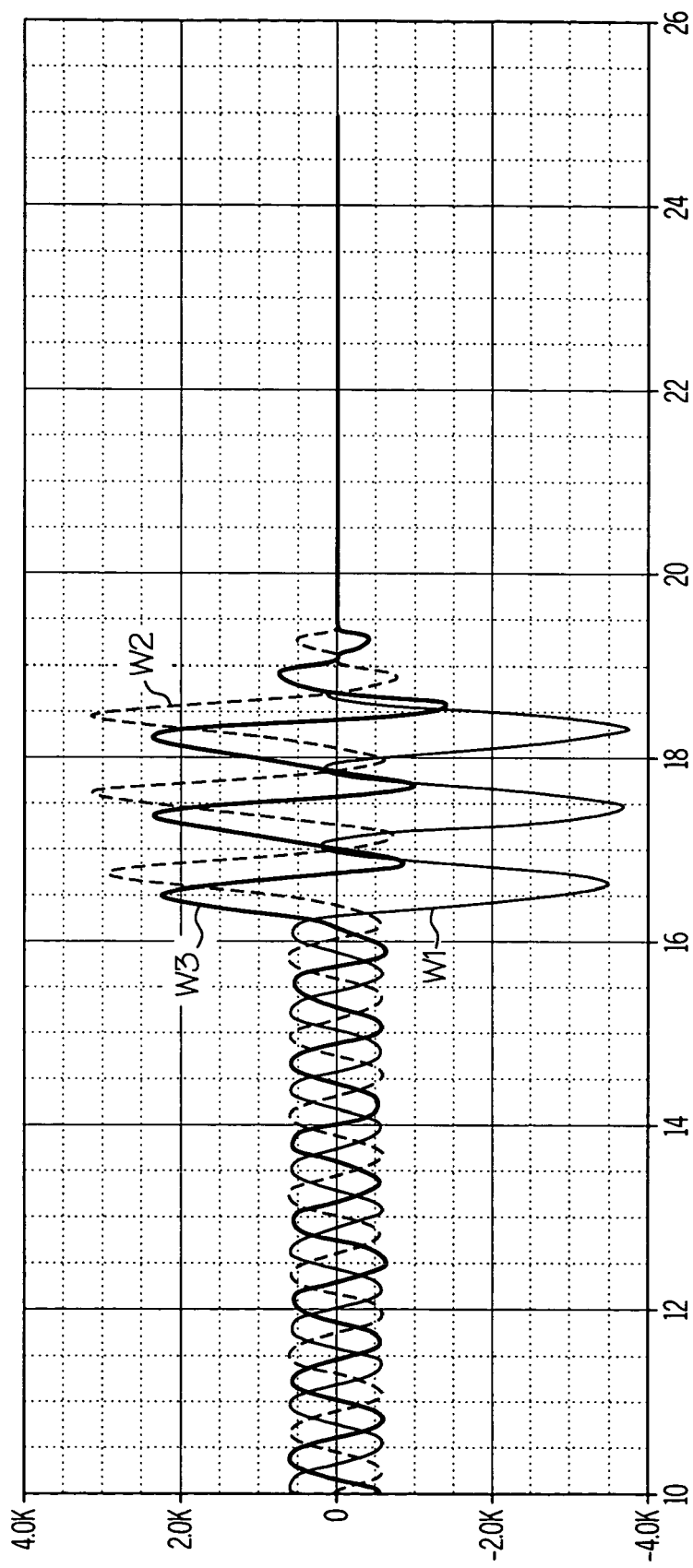
FIG. 5B shows a PSpice simulation results of FIG. 5A.

FIGS. 5A and 5B show a PSpice simulation of a short circuit to ground fault in the PMM-based system 102 of the present invention. The topmost first winding 116a in FIG. 5A, designated (W1), may be shorted to ground in the simulation by first switch (S1) 126. FIG. 5B shows the currents running though each winding graphed against time. The shorting first switch (S1) 126 was closed at about 16.1 microseconds which caused the current in winding (W1) 116a to increase by a factor of about seven and go in one direction as the voltage of the winding 116a drops below that of the neutral point 120. This caused subsequent current increases in second winding (W2) 116b and third winding (W3) 116c as the short affected those windings through the neutral point 120. In the simulation of FIGS. 5A and 5B, the faulted winding (W1) 116a was cut off from the neutral point 120 first, with the other windings 116b, 116c following. The reaction time was about 2 milliseconds, corresponding to the reaction time of an AC contactor (Table 1).

Figure 6A:
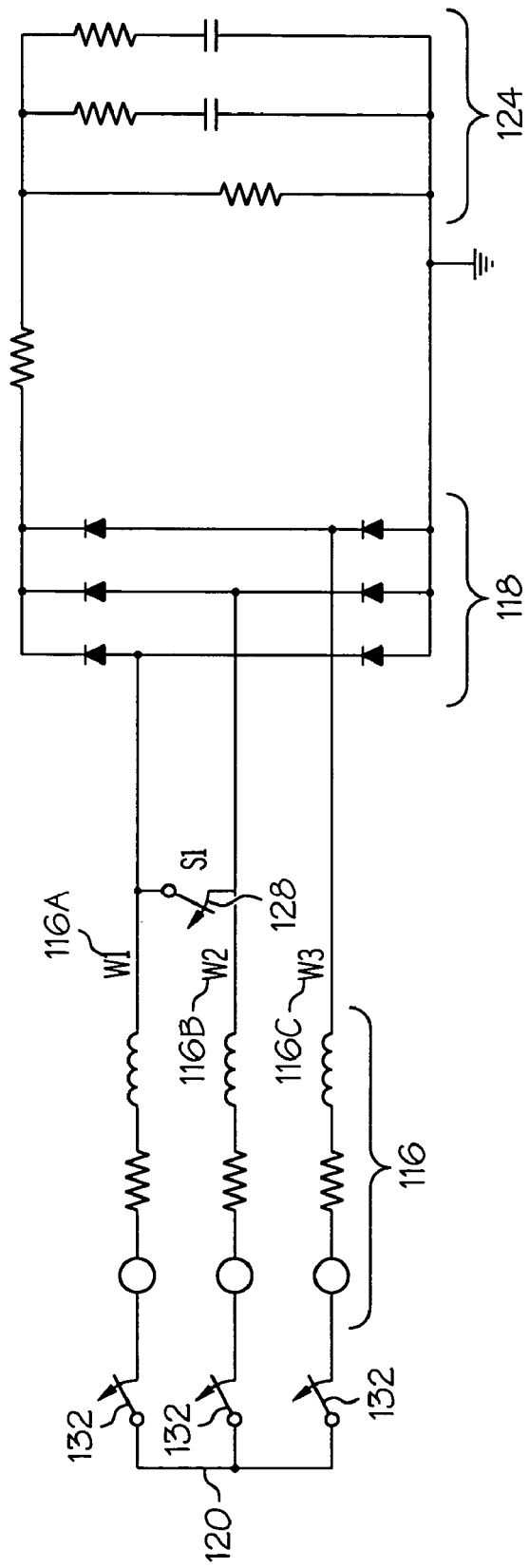
FIG. 6A is a schematic representation of the fault protection system configured to simulate a short between windings, according to the invention.
Figure 6B:
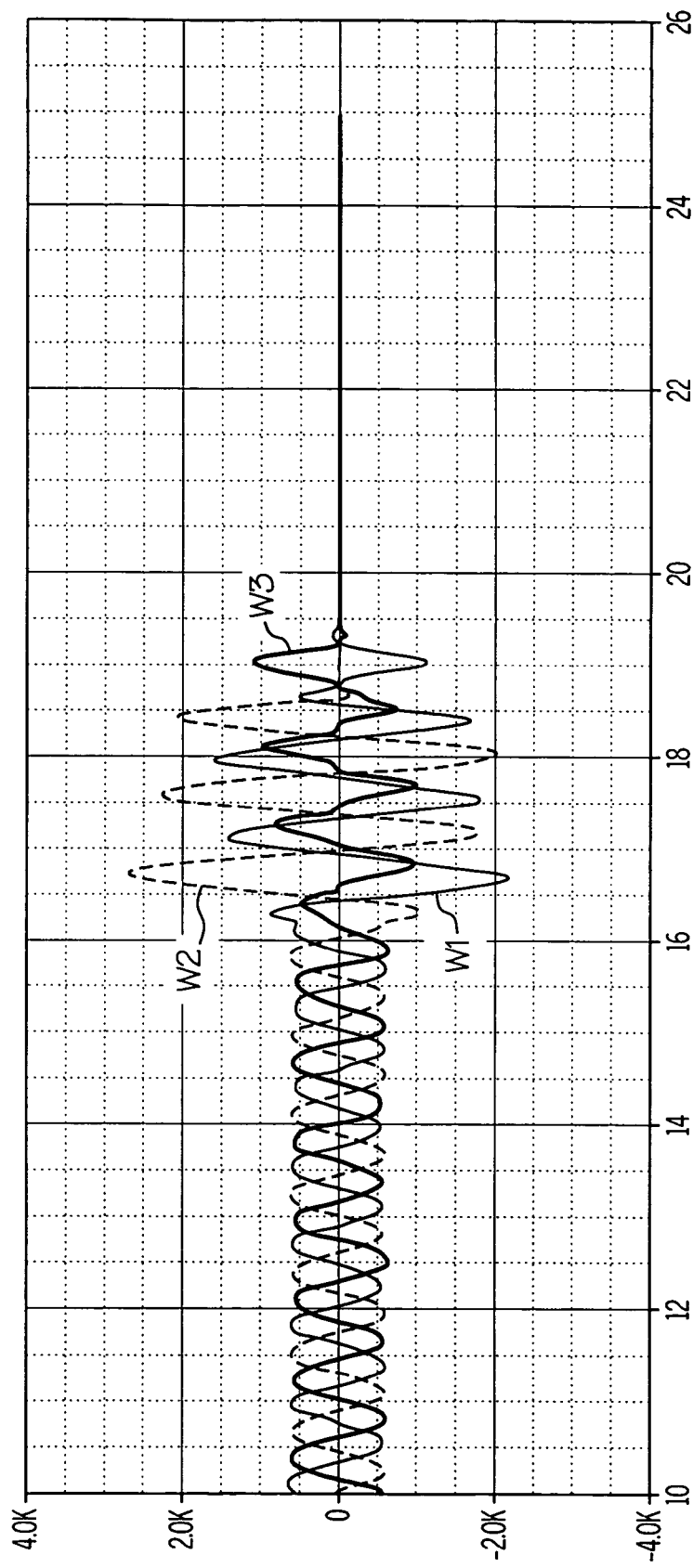
FIG. 6B shows a PSpice simulation results of FIG. 6A.

FIGS. 6A and 6B show a PSpice simulation of a winding-to-winding short between first winding (W1) 116a and second winding (W2) 116b in the PMM-based system 102 of the present invention. The short is simulated using a second switch (S2) 128. The shorting second switch (S2) 128 was closed at about 16.0 microseconds which caused the current in first winding (W1) 116a to increase by a factor of about four and the current in second winding (W2) 116b to increase by a factor of about five. The difference in increase was a function of the relative phases the two windings were in at the time of the short. A subsequent current increase was observed in third winding (W3) 116c as the short affects third winding (W3) 116c through the neutral point 120. In this simulation of FIGS. 6A and 6B, the faulted first winding (W1) 116a and second winding (W2) 116b were cut off from the neutral point 120 first, with the third winding (W3) 116c following. The reaction time was about 3 milliseconds, corresponding to the reaction time of an AC contactor (Table 1).

It should be noted that it may not be necessary to shut off the non-faulted windings 116. Logic circuitry may be included with the sensors to exclude the unfaulted windings and permit them to continue functioning.

The present invention further provides a method 300 for interrupting a short-circuit fault in a PMM-based system where a PMM of the PMM-based system comprises a plurality of windings and a neutral point. As shown in FIG. 7, method 300 may comprise the step 302 of detecting a short-circuit fault in the PMM-based system where the short circuit may be, but not limited to, in a winding, an AC feeder, an inverter/converter or a DC feeder and, in response to the detection of the short-circuit fault in step 302, step 304 of activating a bidirectional fault switch, wherein the bidirectional fault switch isolates the short-circuit fault by isolating at least one winding along the path of the fault, the bidirectional fault switch connecting the at least one winding along the path of the fault to the neutral point. The short-circuit fault may be detected by sensors. The short-circuit fault may further be detected by monitoring current in the plurality of windings where the short-circuit fault causes the current to exceed a predetermined maximum threshold level.

As can be seen then, a system and method has been disclosed that may effectively utilize bidirectional fault switches to isolate faulted windings from the neutral point with rapid speed, thereby protecting the permanent magnet machine from heat damage.

While various values, scalar and otherwise, may be disclosed herein, it is to be understood that these are not exact values, but rather to be interpreted as "about" such values, unless explicitly stated otherwise. Further, the use of a modifier such as "about" or "approximately" in this specification with respect to any value is not to imply that the absence of such a modifier with respect to another value indicated the latter to be exact.

It should be understood, of course, that the foregoing relates to exemplary embodiments of the invention and that modifications may be made without departing from the spirit and scope of the invention as set forth in the following claims.

We claim:

1. A permanent magnet machine-based system comprising:
   a permanent magnet machine, the permanent magnet machine comprising a plurality of windings and a neutral point;
   a neutral winding decoupling fault protector, the neutral winding decoupling fault protector comprising;
   at least one bidirectional fault switch, the bidirectional fault switch connecting the at least one of the plurality of windings to the neutral point, and wherein the bidirectional fault switch is capable of completely electrically disconnecting at least one of the plurality of windings from the neutral point; and
   at least one sensor, the sensor adapted to detect a fault in the permanent magnet machine-based system and to open the bidirectional fault switch when the fault is detected by the sensor;
   wherein the at least one bidirectional fault switch comprises either a) two n-type semiconductor transistors, a source, and a gate, wherein the two n-type semiconductor transistors are connected in a common source and common gate configuration, or b) the at least one bidirectional fault switch comprises two p-type semiconductor transistors, a drain, and a gate, wherein the two p-type semiconductor transistors are connected in a common drain and common gate configuration.

2. The permanent magnet machine-based system of claim 1 wherein the bidirectional fault switch and the sensor are integrated.

3. The permanent magnet machine-based system of claim 1 wherein the n-type semiconductor transistors are metal-oxide semiconductor field-effect transistors or insulated gate bipolar transistors.

4. The permanent magnet machine-based system of claim 1 wherein the two p-type semiconductor transistors are metal-oxide semiconductor field-effect transistors or insulated gate bipolar transistors.

5. The permanent magnet machine-based system of claim 1 wherein there is one bidirectional fault switch for each of the windings of the permanent magnet machine.

6. The permanent magnet machine-based system of claim 1 further comprising:
   a load, the load having an electrical connection with the permanent magnet machine, wherein the load is an AC load or a DC load,
   an AC feeder, the AC feeder delivering AC output from the permanent magnet machine to the load when the load in an AC load;
   a inverter/converter for converting AC output from the permanent magnet machine to DC output;
   a DC feeder, the DC feeder delivering the DC output from the inverter/converter to the load when the load is a DC load; and
   wherein the sensor is adapted to detect a fault in at least one of the plurality of windings, the AC feeder, the inverter/converter or the DC feeder.

7. A permanent magnet machine-based system comprising:
- a permanent magnet machine, the permanent magnet machine comprising a plurality of windings and a neutral point; and
- a neutral winding decoupling fault protector, the neutral winding decoupling fault protector comprising;
- at least one bidirectional fault switch, the bidirectional fault switch connecting the at least one of the plurality of windings to the neutral point, wherein the bidirectional fault switch is capable of completely electrically disconnecting at least one of the plurality of windings from the neutral point and wherein the bidirectional switch is a solid-state switch; and
- at least one sensor, the sensor adapted to detect a fault in the permanent magnet machine-based system and to open the bidirectional fault switch when the fault is detected by the sensor, wherein the bidirectional fault switch comprises either:
- a) an n-type bidirectional fault switch, wherein the n-type bidirectional fault switch comprises:
  - a first and a second n-type semiconductor transistors, a common source, and a common gate, wherein the first and second n-type semiconductor transistors are connected in a common source and common gate configuration;
  - a first drain and a second drain, the first drain being in electrical communication with the first n-type semiconductor transistor and the second drain being in electrical communication with the second n-type semiconductor transistor; and
  - a first diode and a second diode, wherein the first diode is connected to the first n-type semiconductor transistor and the second diode is connected to the second n-type semiconductor transistor, the first and second diodes creating a path for the flow of a current from the common source through the first and second n-type semiconductor transistors to the first and second drains, or
- b) a p-type bidirectional fault switch, wherein the p-type bidirectional fault switch comprises:
  - a first and a second p-type semiconductor transistors, a common drain and a common gate, wherein the first and second p-type semiconductor transistors are connected in a common drain and common gate configuration;
  - a first source and a second source, the first source being connected to the first p-type semiconductor transistor and the second source being connected to the second p-type semiconductor transistor; and
  - a first diode and a second diode, wherein the first diode is connected to the first p-type semiconductor transistor and the second diode is connected to the second p-type semiconductor transistor, the first and second diodes create a path for the flow of a current from the first and second sources through the first and second p-type semiconductor transistors, respectively, to the common drain.

8. The permanent magnet machine-based system of claim 7 wherein:
- the bidirectional fault switch is an n-type bidirectional fault switch;
- the first and second n-type semiconductor transistors are metal-oxide semiconductor field-effect transistors; and
- the first and second diodes are formed by shorting the first and second n-type semiconductor transistors to the common source.

9. The permanent magnet machine-based system of claim 7 wherein:
- the bidirectional fault switch is a p-type bidirectional fault switch;
- the first and second p-type semiconductor transistors are metal-oxide semiconductor field-effect transistors, and
- the first and second diodes are formed by shorting the first and second p-type semiconductor transistors to the first and second sources, respectively.

10. The permanent magnet machine-based system of claim 7 further comprising:
- a load in electrical communication with the permanent magnet machine, where the load is an AG load or a DC load,
- an AC feeder, the AC feeder delivering AC output from the permanent magnet machine to the load when the load in an AC load;
- a inverter/converter for converting AC output from the permanent magnet machine to DC output;
- a DC feeder, the DC feeder delivering the DC output from the inverter/converter to the load when the load is a DC load; and
- wherein the sensor is adapted to detect a fault in at least one of the plurality of windings, the AC feeder, the inverter/converter or the DC feeder.

* * * * *